(12) United States Patent
Diamandis et al.

(10) Patent No.: US 9,409,658 B1
(45) Date of Patent: Aug. 9, 2016

(54) SPACE-BASED STRUCTURES AND METHODS OF DELIVERING SPACE-SOURCED MATERIALS

(71) Applicant: Planetary Resources Development Corp., Redmond, WA (US)

(72) Inventors: Peter H. Diamandis, Santa Monica, CA (US); Eric Anderson, Bellevue, WA (US); Chris Lewicki, Bellevue, WA (US); Chris Voorhees, Issaquah, WA (US)

(73) Assignee: Planetary Resources Development Corp., Redmond, WA (US)

( * ) Notice: Subject to any disclaimer, the term of this patent is extended or adjusted under 35 U.S.C. 154(b) by 517 days.

(21) Appl. No.: 14/218,430

(22) Filed: Mar. 18, 2014

Related U.S. Application Data

(60) Provisional application No. 61/794,976, filed on Mar. 15, 2013.

(51) Int. Cl.
| | |
|---|---|
| *B64G 99/00* | (2009.01) |
| *B64G 1/24* | (2006.01) |
| *E21C 51/00* | (2006.01) |
| *B64G 1/62* | (2006.01) |
| *B64G 1/00* | (2006.01) |
| *C22B 9/00* | (2006.01) |

(52) U.S. Cl.
CPC .. *B64G 9/00* (2013.01); *B64G 1/00* (2013.01); *B64G 1/242* (2013.01); *B64G 1/62* (2013.01); *C22B 9/00* (2013.01); *E21C 51/00* (2013.01)

(58) Field of Classification Search
CPC .............. B64G 9/00; B64G 1/62; B64G 4/00; B64G 2001/1064; B64G 2001/1071; E21C 51/00
See application file for complete search history.

(56) References Cited

U.S. PATENT DOCUMENTS

2006/0219606 A1* 10/2006 Sutton ..................... E21C 51/00
209/212

OTHER PUBLICATIONS

Banhart, John, "Manufacturing Routes for Metallic Foams," Journal of Materials 52 (12), 2000, pp. 22-27. Retrieved using Internet from: http://www.tms.org/pub/journals/JOM/0012/Banhart-0012.html.

* cited by examiner

*Primary Examiner* — Brian M O'Hara
(74) *Attorney, Agent, or Firm* — Venable LLP; Steven J. Schwarz; Tamatane J. Aga

(57) ABSTRACT

A method is provided for processing extraterrestrial metal into a metal foam or gossamer structure in space, and delivering the metal foam or gossamer structure intact to the Earth's surface. Additionally, a structure is provided that is formed in space and consists essentially of an extraterrestrial metal.

11 Claims, 3 Drawing Sheets

SPACE-BASED STRUCTURES AND METHODS OF DELIVERING SPACE-SOURCED MATERIALS

CROSS-REFERENCE TO RELATED APPLICATIONS

This application claims priority under 35 U.S.C. Section 119 to U.S. Provisional Application No. 61/794,976, filed on Mar. 15, 2013, the entire content of which is incorporated herein by reference. This application also relates to U.S. application Ser. No. 13/869,643, filed on Apr. 24, 2013, the entire content of which is incorporated herein by reference.

BACKGROUND

The development of space resources, particularly the comparatively abundant platinum group metals measured in the meteorite population and anticipated to be in the Near Earth Asteroid Population, require an unprecedented scale of space transportation in order to bring these valuable and useful materials to a terrestrial market.

Humankind has delivered payloads to space and returned them safely back through atmospheric re-entry over the last 50 years using technology such as capsules, lifting bodies, and most recently testing of inflatable aeroshells. This conventional technique of containerized protection is inefficient, leaving unusable scar mass that is a significant percentage of the returned system.

Low areal density metallic structures have been used in numerous space-based applications. For example, open-celled metal foams, primarily aluminum and copper, have been used over the past 40 years in an array of terrestrial applications related to heat exchange, energy absorption and flow diffusion. High production costs have limited the use of the material to advanced technology and aerospace applications, including electronics cooling, cryogen tanks, and phase change material heat exchangers. Over the past two decades, metal foams have been implemented in the space environment for shielding against meteorite impacts and have been considered for space-based application including large space mirror substrates, foam core for composite sandwich structures, planetary rover wheels, and porous storage vessels for propellant, cryogenic fluids, and superfluids.

However, to date, there has been little or no work in the creation of, for example, low areal density metallic structures in the space environment and delivery to earth.

SUMMARY

According to an embodiment, a method is provided comprising processing extraterrestrial metal into a metal foam or gossamer structure in space, and delivering the metal foam or gossamer structure intact to the Earth's surface.

According to another embodiment, a structure is provided which is formed in space and consists essentially of an extraterrestrial metal.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments of the invention are discussed in detail below. While specific embodiments are discussed, it should be understood that this is done for illustration purposes only. For example, the terms "space-based," "space," "extraterrestrial," and "extraplanetary" are used but the described structures and methods may be adapted to be used in any non-Earth, high Earth atmosphere, microgravity, and/or vacuum environment. A person skilled in the relevant art will recognize that other components, configurations, and environments can be used without departing from the spirit and scope of the invention.

As explained in greater detail below, the disclosed methods are directed to, for example, extracting metals or materials from a space-based, extraterrestrial, or extraplanetary target and delivering them for use in industry or manufacturing. For example, the extraterrestrial target may be an asteroid, planet, and/or other mineral or metal mass in space. It is foreseen that the target may also be an extraplanetary target. In general, it is foreseen that the extracted metals or materials may be delivered to the Earth's surface or otherwise within the Earth's atmosphere. However, it is foreseen that the methods may be adapted to deliver the metals or materials to a spacecraft, space station, or other planet.

Figure 1:
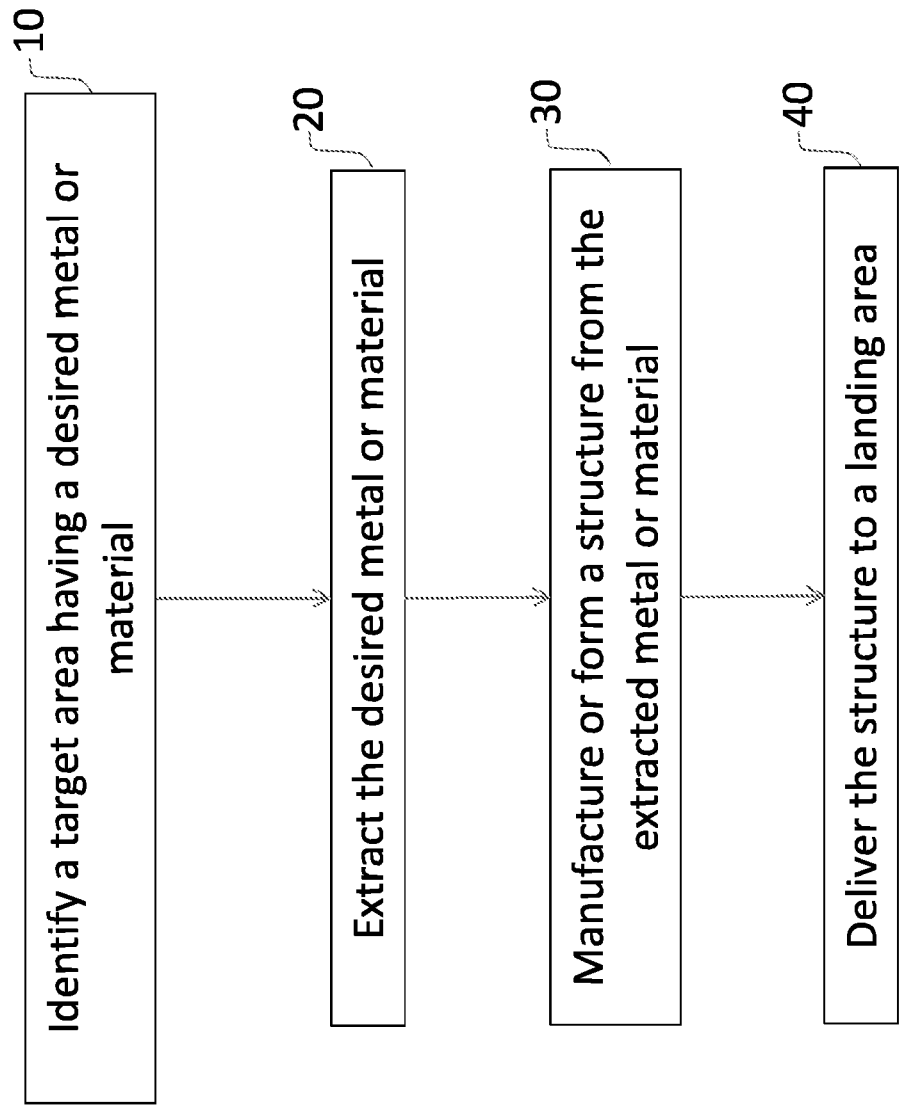
FIG. 1 depicts a method according to an embodiment.

Referring now to FIG. 1, a method of recovering a space-sourced material may generally comprise producing a spaced-based low areal density structure in order to deliver a mass or structure consisting entirely of, or consisting essentially of, a desired material or metal. For example, a marking or indicating material may not be considered essential. In particular, the method may comprise identifying an extraterrestrial target area having a desired material 10, extracting the desired material 20, manufacturing or forming a structure with the extracted material 30, and delivering the structure 40 through an atmosphere to a terrestrial environment or surface. According to an embodiment, creation of structures by means of space-based low areal density foam production in a space environment may enable the entire returned mass, or approximately or essentially, the entire returned mass, to consist of the desired material.

According to an embodiment, the method may further comprise extracting and preparing raw material, such as a metal, for foam or material processing, optimizing an entry body configuration and entry trajectory through Earth's atmosphere, and using space-based additive manufacturing techniques to create low areal density metallic structures according to the optimized entry body configuration.

The target area may be identified according to a desired metal or material in space, such as, for example, on or in an extraterrestrial or extraplanetary environment. As explained above, the target may be an asteroid, planet, and/or other mineral or metal mass in space. In particular, the target may be an area on the surface or within the asteroid, planet, and/or other mineral or metal mass in space. Various metals found in space, such as on or in the target areas explained above, may be, for example, but not limited to, nickel, iron, cobalt, and/or platinum group metals (PGMs). Such metals are found in significant quantities on, for example, but not limited to, near Earth asteroids. According to an embodiment, it is foreseen that other metals or materials may be used with or in combination with the described methods. Such metals or materials may be generally referred to as space-sourced metals or materials.

Space-sourced materials may be selected from, for example, but not limited to, the various elements listed in Table 1.

| Density (g/cm$^3$) | Element Name | Symbol | Atomic Number |
|---|---|---|---|
| 2.7 | Aluminum | Al | 13 |
| 3 | Scandium | Sc | 21 |
| 3.12 | Bromine | Br | 35 |
| 3.21 | Chlorine | Cl | 17 |
| 3.59 | Barium | Ba | 56 |
| 3.75 | Krypton | Kr | 36 |
| 4.47 | Yttrium | Y | 39 |
| 4.54 | Titanium | Ti | 22 |
| 4.79 | Selenium | Se | 34 |
| 4.93 | Tellurium | Te | 52 |
| 5.24 | Europium | Eu | 63 |
| 5.32 | Germanium | Ge | 32 |
| 5.5 | Radium | Ra | 88 |
| 5.72 | Arsenic | As | 33 |
| 5.9 | Xenon | Xe | 54 |
| 5.91 | Gallium | Ga | 31 |
| 6.11 | Vanadium | V | 23 |
| 6.15 | Lanthanum | La | 57 |
| 6.24 | Iodine | I | 53 |
| 6.51 | Zirconium | Zr | 40 |
| 6.68 | Antimony | Sb | 51 |
| 6.77 | Cerium | Ce | 58 |
| 6.77 | Praseodymium | Pr | 59 |
| 6.9 | Ytterbium | Yb | 70 |
| 7.01 | Neodymium | Nd | 60 |
| 7.13 | Zinc | Zn | 30 |
| 7.19 | Chromium | Cr | 24 |
| 7.3 | Promethium | Pm | 61 |
| 7.31 | Indium | In | 49 |
| 7.31 | Tin | Sn | 50 |
| 7.43 | Manganese | Mn | 25 |
| 7.52 | Samarium | Sm | 62 |
| 7.87 | Iron | Fe | 26 |
| 7.9 | Gadolinium | Gd | 64 |
| 8.23 | Terbium | Tb | 65 |
| 8.55 | Dysprosium | Dy | 66 |
| 8.57 | Niobium | Nb | 41 |
| 8.65 | Cadmium | Cd | 48 |
| 8.8 | Holmium | Ho | 67 |
| 8.9 | Nickel | Ni | 28 |
| 8.9 | Cobalt | Co | 27 |
| 8.96 | Copper | Cu | 29 |
| 9.07 | Erbium | Er | 68 |
| 9.3 | Polonium | Po | 84 |
| 9.32 | Thulium | Tm | 69 |
| 9.73 | Radon | Rn | 86 |
| 9.75 | Bismuth | Bi | 83 |
| 9.84 | Lutetium | Lu | 71 |
| 9.84 | Lutetium | Lu | 71 |
| 10.07 | Actinium | Ac | 89 |
| 10.22 | Molybdenum | Mo | 42 |
| 10.5 | Silver | Ag | 47 |
| 11.35 | Lead | Pb | 82 |
| 11.5 | Technetium | Tc | 43 |
| 11.72 | Protactinium | Pa | 91 |
| 11.85 | Thallium | Tl | 81 |
| 12.02 | Palladium | Pd | 46 |
| 12.37 | Ruthenium | Ru | 44 |
| 12.41 | Rhodium | Rh | 45 |
| 13.31 | Hafnium | Hf | 72 |
| 13.5 | Curium | Cm | 96 |
| 13.55 | Mercury | Hg | 80 |
| 13.67 | Plutonium | Pu | 94 |
| 14.78 | Berkelium | Bk | 97 |
| 15.1 | Californium | Cf | 98 |
| 15.4 | Thorium | Th | 90 |
| 16.65 | Tantalum | Ta | 73 |
| 18.95 | Neptunium | Np | 93 |
| 19.32 | Gold | Au | 79 |
| 19.35 | Tungsten | W | 74 |
| 19.84 | Americium | Am | 95 |
| 20.2 | Uranium | U | 92 |
| 21.04 | Rhenium | Re | 75 |
| 21.45 | Platinum | Pt | 78 |
| 22.4 | Iridium | Ir | 77 |
| 22.6 | Osmium | Os | 76 |

According to an embodiment, the space-sourced metal or material selected for delivery to Earth may be any metal selected from the elements listed in Table 1. According to another embodiment, the space-sourced metal selected for delivery to Earth may have a natural or naturally occurring density in a range from 2.7 g/cm$^3$ to 22.7 g/cm$^3$. According to yet another embodiment, the space-sourced metal selected for delivery to Earth may have a natural or naturally occurring density of a range from 12.0 g/cm$^3$ to 22.7 g/cm$^3$. The space-sourced metal or material may be only one metal or material, such as, for example, a pure metal or material. Alternatively, the space-sourced metal or material may be a plurality of metals or materials or an alloy of two or more metals or materials.

The desired space-sourced metal or material may be identified by, for example, but not limited to, mass spectrometry (with a mass spectrometer), x-ray, gravitational force/pull analysis, or other density analysis, as known to one of ordinary skill in the art. For example, the desired space-sourced metal or material may be directly identified with testing or analysis equipment located at or near the space-sourced metal or material. The equipment may be delivered to the location with a spacecraft or rocket powered vessel. Alternatively, the desired space-sourced metal or material may be indirectly identified with equipment at a location remote from the space-sourced metal or material. Equipment at the remote location may observe the space-sourced metal or material with a telescope and analysis equipment.

Extraction of the desired space-sourced metal or material may use, for example, a carbonyl metallurgical process employing carbonyl metallic compounds (organometallic compounds with CO ligands). Carbonyl metallic compounds for metal extraction may include, for example, but not limited to, direct refining and deposition of nickel, iron, cobalt, and platinum group metals (PGMs). The extraction process may be completed by chemical vapor deposition (CVD) of the desired space-sourced metal or material. For example, a mining spacecraft may be equipped with a CVD chamber and equipment.

For example, the mining spacecraft may be used to identify and extract the space-sourced metal or material. According to an embodiment, the mining spacecraft may comprise one or more relatively autonomous, robotic units that are operated in conjunction with a command and control housed in a ground station on Earth. The mining spacecraft may further comprise equipment for analyzing density, either locally or remotely, and determining a location of the space-sourced metal or material. The mining spacecraft may further comprise a drill and/or excavation equipment for excavating identified space-sourced metals or materials. The drill and/or excavation equipment may be operated by or consist of the robotic units.

According to an embodiment, the extracted space-sourced metal or material may be used to form thin wires. For example, the CVD chamber and equipment may form the thin wires. The thin wires of space-sourced metal or material may be used as feedstock in an additive manufacturing process within the microgravity or vacuum environment in space or extraterrestrial or extraplanetary environment. The thin wires of space-sourced metal or material may be only one metal or material, such as, for example, a pure metal or material. Alternatively, the thin wires of space-sourced metal or material may be a plurality of metals or materials or an alloy of two or more metals or materials. As explained in greater detail below, gossamer structures may be formed or manufactured with the additive manufacturing process using the thin wires of space-sourced metal or material.

According to an embodiment, the extracted space-sourced metal or material may be used to form a metal foam. Metal foam generally describes metallic material which contains voids, such as cellular metal where space is divided into distinct cells; porous metal with a multitude of pores; and metal sponge with a network of metal co-existing with a network of empty space which is also interconnected.

The metal foam may be a cellular structure generally consisting of a solid metal containing a large volume fraction of gas-filled pores. The pores may be be sealed (closed-cell foam), or they may form an interconnected network (open-cell foam). In general, metal foams may have a very high porosity which achieves what is considered in the art to be an ultralight material. For example, the metal foam may have approximately 75%-95% of the volume consisting of void spaces. The strength of foamed metal may possess a power law relationship to its density. For example, a 20% dense material may be more than twice as strong as a 10% dense material. Additionally, the metal foam may retain at least some physical properties of the base or extracted space-sourced metal or material. The coefficient of thermal expansion of the metal foam may also remain similar to the base or extracted space-sourced metal or material while thermal conductivity of the metal foam may likely be reduced.

Metal foam production may be accomplished through various metal foam production processes, as explained in "Manufacturing Routes for Metallic Foams," John Banhart, Journal of Materials 52 (12) (2000), pp. 22-27, the disclosure of which is incorporated herein, in its entirety. For example, these processes include: foaming of Melts by Gas Injection (Hydro/Alcan), foaming of Melts with Blowing Agents (Alporas), solid-Gas Eutectic Solidification (Gasar), and foaming of Powder Compacts (Foaminal/Alulight). As known to one of ordinary skill in the art, the various metal foam production processes may be adapted or adjusted in order to perform in microgravity and/or vacuum conditions of the space, extraterrestrial, or extraplanetary environment.

Through a process of metal foaming, the density of the extracted space-sourced metal or material may be substantially reduced to achieve a low-areal density, or a very low ballistic coefficient, structure. According to an embodiment, processed metal foam densities of approximately 0.5%, or less than 1%, or less than 5%, or less than 10%, of the original density (0.06 g/cm$^3$-0.11 g/cm$^3$) may be achieved which allow for the lowest conceivable terminal velocities during delivery of the extracted space-sourced metal or material, as explained in more detail more. Higher foam densities may also be used, provided that, for example, the delivery of the extracted space-sourced metal or material can be landed safely and economically on Earth. For example, as comparison, metal foam of aluminum and its alloys have low density of approximately 0.4 g/cm$^3$-0.9 g/cm$^3$. Additionally, the metal foam may have a high stiffness, are fire resistant, do not give off toxic fumes, are fully recyclable, have high energy absorbance, low thermal conductivity, and low magnetic permeability.

Low areal density metal foam structures may be formed or manufactured through additive manufacturing technologies, for example, for usage both directly in space and for return to a point of need. For example, the low areal density metal foam structures may be delivered to the Earth's or other planet's surface for use in manufacturing, industry, defense, or other uses.

According to embodiment, the mining spacecraft may further comprise metal foaming equipment and/or additive manufacturing equipment in order to manufacture, form, or fabricate the metal foam or gossamer structures. The metal foaming equipment and/or additive manufacturing equipment may be operated by or consist of the robotic units of the mining spacecraft.

It is foreseen that the low areal density metal foam structure may be delivered to planets, spaceships, space stations, and/or other locations identified as a point of need. For example, the low areal density metal foam structures may achieve efficient and timely delivery of the extracted space-sourced metal or material to the Earth's surface, space vehicle shielding from meteorite and space debris impact, thermal shielding for missions to extreme thermal environments, and vehicular and space facility structures benefiting from high surface area and strength to density ratios (wheels, load-bearing beams, etc.).

According to an embodiment, the additive manufacturing or fabrication process using the thin wires and/or metal foam of the extracted space-sourced metal or material may be used to fabricate space transport and/or atmospheric entry structures in the space, extraterrestrial, or extraplanetary environment. For example, the low areal density metal foam or gossamer structure may be configured to have a geometry optimized as a low areal density entry bodies, created specifically for an extremely low terminal velocity. According to an embodiment, no other materials or shielding is required to protect the low areal density metal foam or gossamer structure during delivery. Accordingly, the entire low areal density metal foam or gossamer structure consists of the desired space-sourced metal or material. According to an embodiment, the low areal density metal foam or gossamer structure consists essentially of the desired space-sourced metal or material and does not have shielding or protective materials.

Figure 2:
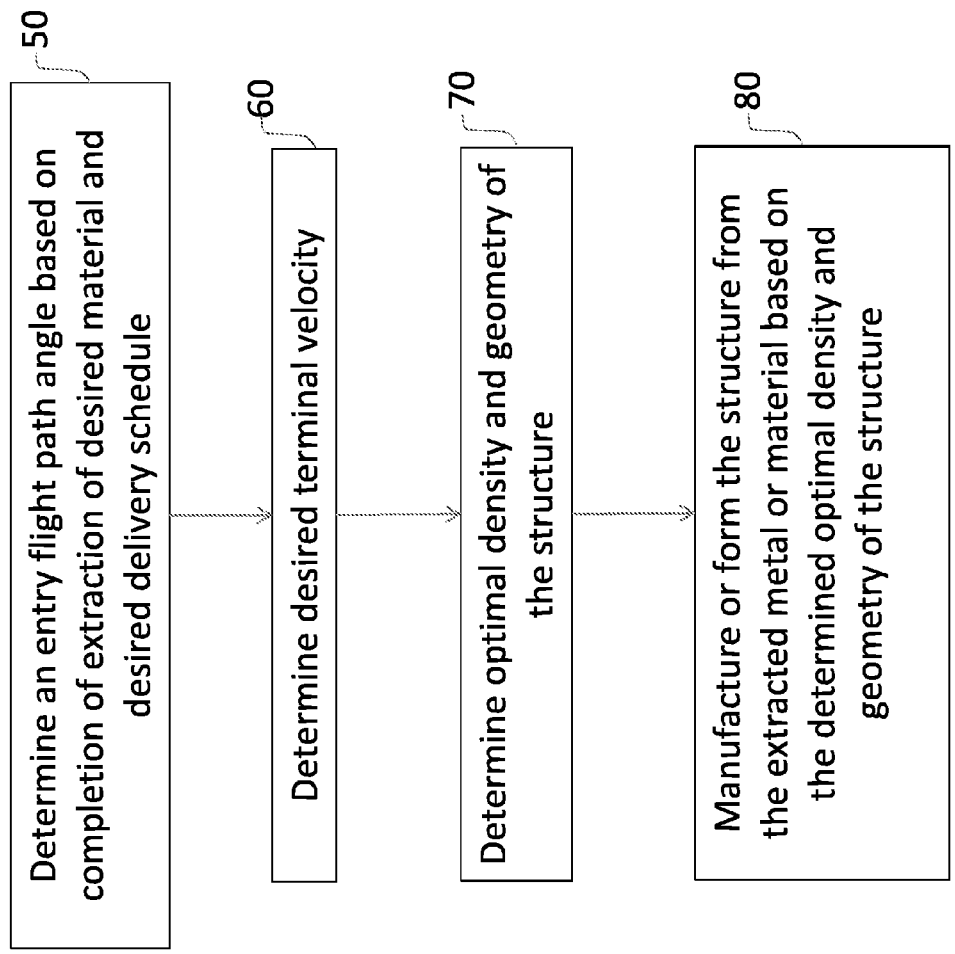
FIG. 2 depicts a further method according to an embodiment.

Referring now to FIG. 2, the geometry or shape of the low areal density metal foam or gossamer structure may be configured according to a particular path for atmospheric entry for delivery within a planet's atmosphere, as explained in greater detail below. The method may further comprise determining an entry flight path angle based on completion of extraction of desired material and desired delivery schedule 50, determining desired terminal velocity 60 of the metal foam or gossamer structure during delivery, determining the optimal density and geometry 70 of the metal foam or gossamer structure, and manufacturing or forming the metal foam or gossamer structure 80 from the extracted metal or material based on the determined optimal density and geometry.

The determinations may be performed or calculated by a computing device 400 having software configured to perform the determinations or calculations, as illustrated in FIG. 4, which is described in more detail below.

For example, the geometry of the low areal density metal foam or gossamer structure may be configured to have a particular acceleration and/or deceleration profile based on entry conditions or a target landing zone. For example, the acceleration or deceleration profile of the low areal density metal foam or gossamer structure may allow the low areal density metal foam or gossamer structure to decelerate to a low velocity in the upper atmosphere to achieve a low terminal velocity before impacting the Earth's surface in a targeted and controlled range.

As explained above, the configuration of the geometry and fabrication of the low areal density metal foam or gossamer structure in the space, extraterrestrial, or extraplanetary environment may be determined according to a particular delivery path and schedule. For example, the delivery path may be through the Earth's atmosphere to a delivery target on the Earth's surface. Accordingly, a control entry path to the delivery target may be time dependent based on the position of the low areal density metal foam or gossamer structure in space and the rotational position of the Earth. Both the geometry and/or density of the areal density metal foam or gossamer structure may be adjusted according to a scheduled or estimated completion time of fabrication of the metal foam or gossamer structure in order to satisfy the entry path and time requirements of delivery. For example, the geometry and/or density of the metal foam or gossamer structure may be configured for different acceleration or deceleration profiles.

At least one or a plurality of TUGs may be used in combination with the metal foam or gossamer structure made from the extracted space-sourced metal or material. The metal foam or gossamer structure may be safely delivered to a control entry trajectory by the cycling controlled TUG or TUGs to ensure positive and safe control and minimal uncertainty in a landing ellipse. The TUG may operate on asteroid-derived fuels and cycle between the target area of the desired metal or material (i.e. asteroid) and an appropriate orbit configuration to deploy the returned payload or metal foam or gossamer structure. The delivery or entry path may be selected from a range of entry-flight-path angles which may effect the structural and/or thermal loading on the metal foam or gossamer structure. For example, a high or steep entry-flight-path angle can greatly tighten or shrink the landing area footprint but increase structural and/or thermal loading on the metal foam or gossamer structure. Alternatively, structural and/or thermal loading on the metal foam or gossamer structure can be eased or decreased by use of a low or shallow entry-flight-path angle. As explained above, the geometry and density of the metal foam or gossamer structure may be configured according to the particular entry path based on the expected structural and thermal loading and maintain the structural integrity of the metal foam or gossamer structure.

According to an embodiment, it is foreseen that the metal foam or gossamer structure may have a passive flight nature of during entry. For example, the passive shape or geometry of the metal foam or gossamer structure may not affect the entry path. It is foreseen that the passive nature of the metal foam or gossamer structure may be maintained for cost and complexity considerations.

According to an embodiment, passive beacons, which may be interrogated for end position verification, may be incorporated in these devices to aid in determining the final landing location on Earth's surface, for example.

The delivery trajectory of the metal foam or gossamer structure for an Earth landing may depend on, for example, the size of the landing final land area. It is foreseen that interplanetary returns or delivery may be conducted in various regulated ranges, such as the Utah Test and Training Range (UTTR) in the USA, or the RAAF Woomera Test Range in Australia. Future ranges may include, for example, open deserts in the middle east or the Sahara. Entry angles may be achievable with entry flight path angles from the traditional single-digit degrees, with targeting accuracy increasing as the angle is increased. According to an embodiment, a maximum allowable flight path angle may be selected based on a maximum allowable structural and thermal loading of the metal foam or gossamer structure. For example, the maximum allowable structural and thermal loading of the metal foam or gossamer structure may be a force and/or temperature before which the metal foam or gossamer structure loses structural integrity or otherwise structurally fails.

According to an embodiment, the arrival velocity (V-infinity) of the metal foam or gossamer structure may range from approximately 1000 m/s to approximately 15 km/s from its interplanetary arrival trajectory. The arrival velocity may depend on, for example, the arrival orbit. According to an embodiment, the low-ballistic coefficient configuration of a metal foam structure may be configured to achieve 60 m/s at terminal velocity.

The geometric configuration and density of the metal foam or gossamer structure and the entry flight path angles may be determined after the desired metal or material is identified and extracted. For example, if the desired metal or material is extracted more quickly than expected, a low or shallow entry flight path angle may be selected so that so a relatively higher density of the metal foam or gossamer structure can be used to achieve a relatively low terminal velocity. On the other hand, if the desired metal or material is extracted slower than expected or if an immediate need is identified on the Earth's surface, a high or steep entry flight path angle may be selected so that a relatively high density and/or a more complex geometric configuration of the metal foam or gossamer structure may be required to achieve a desired terminal velocity to maintain structural integrity of the metal foam or gossamer structure and safe delivery to the Earth's surface.

It is foreseen that the metal foam or gossamer structure made from the extracted space-sourced metal or material, such as a platinum group metal, manufactured, formed, or fabricated in a space, extraterrestrial, extraplanetary environment may achieve economic resource extraction, processing, and delivery of space-sourced metals or materials from space or near Earth asteroids.

Figure 3:
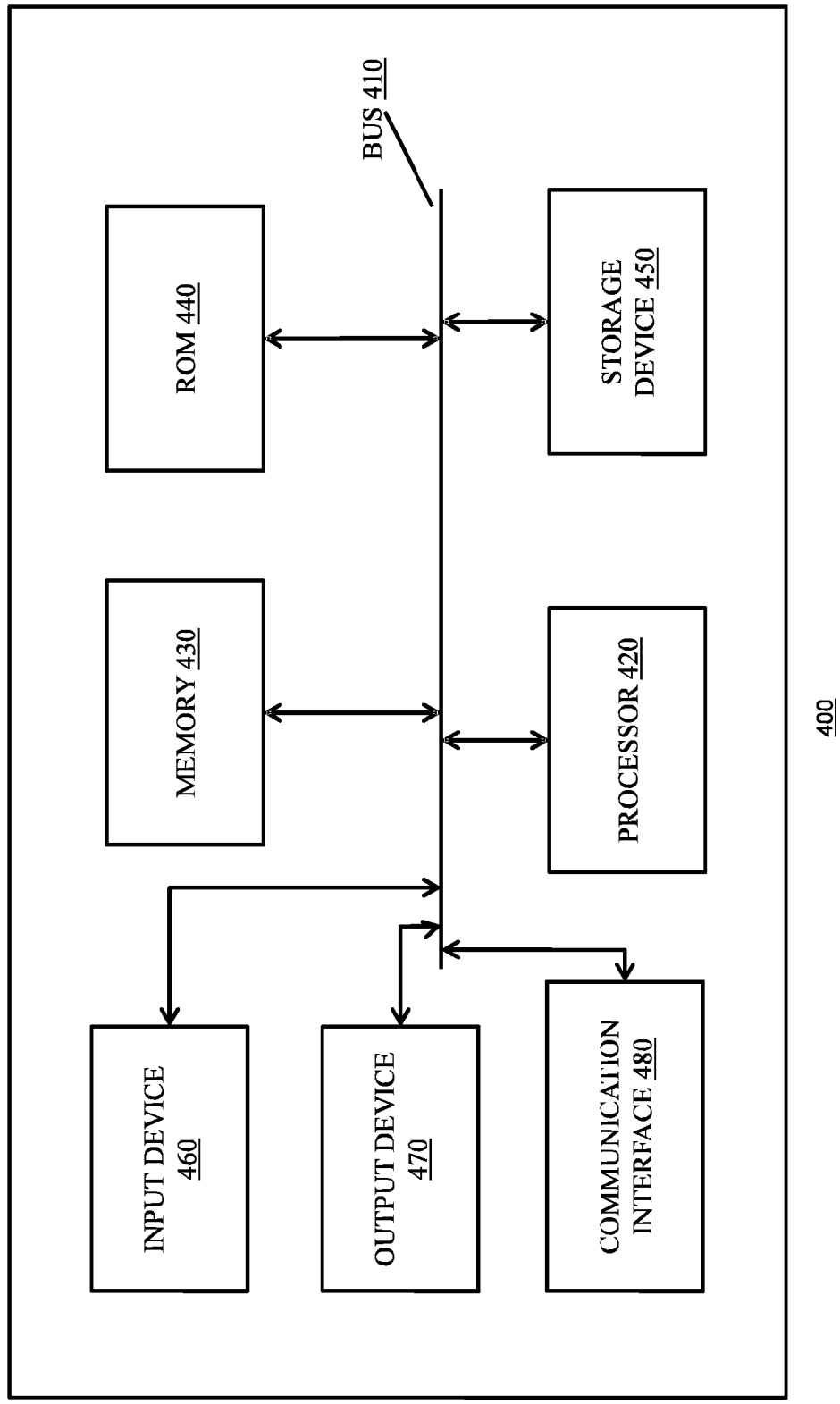
FIG. 3 depicts an exemplary embodiment of a computing unit.

FIG. 3 depicts an exemplary architecture for implementing a computing device 400 in accordance with one or more embodiments, which may be used to implement any of the computing devices discussed herein, or any other computer system or computing device component thereof. It will be appreciated that other devices that can be used with the computing device 400, such as a client or a server, may be similarly configured. As illustrated in FIG. 3, computing device 400 may include a bus 410, a processor 420, a memory 430, a read only memory (ROM) 440, a storage device 450, an input device 460, an output device 470, and a communication interface 480. Bus 410 may include one or more interconnects that permit communication among the components of computing device 400. Processor 420 may include any type of processor, microprocessor, or processing logic that may interpret and execute instructions (e.g., a field programmable gate array (FPGA)). Processor 420 may include a single device (e.g., a single core) and/or a group of devices (e.g., multi-core). Memory 430 may include a random access memory (RAM) or another type of dynamic storage device that may store information and instructions for execution by processor 420. Memory 430 may also be used to store temporary variables or other intermediate information during execution of instructions by processor 420.

ROM 440 may include a ROM device and/or another type of static storage device that may store static information and instructions for processor 420. Storage device 450 may include a magnetic disk and/or optical disk and its corresponding drive for storing information and/or instructions. Storage device 450 may include a single storage device or multiple storage devices, such as multiple storage devices operating in parallel. Moreover, storage device 450 may reside locally on the computing device 400 and/or may be remote with respect to a server and connected thereto via network and/or another type of connection, such as a dedicated link or channel.

Input device 460 may include any mechanism or combination of mechanisms that permit an operator to input information to computing device 400, such as a keyboard, a mouse, a touch sensitive display device, a microphone, a pen-based pointing device, and/or a biometric input device, such as a voice recognition device and/or a finger print scanning device. For example, the desired entry path angle and terminal velocity may be input to the computing device 400. Output device 470 may include any mechanism or combination of mechanisms that outputs information to the additive manufacturing device or operator, including a display, a printer, a speaker, etc.

Communication interface 480 may include any transceiver-like mechanism that enables computing device 400 to communicate with other devices and/or systems, such as a client, a server, a license manager, a vendor, etc. For example, communication interface 480 may include one or more interfaces, such as a first interface coupled to a network and/or a second interface coupled to a license manager. Alternatively, communication interface 480 may include other mechanisms (e.g., a wireless interface) for communicating via a network, such as a wireless network. In one implementation, communication interface 480 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 400 may perform certain functions in response to processor 420 executing software instructions contained in a computer-readable medium, such as memory 430. In alternative embodiments, hardwired circuitry may be used in place of or in combination with software instructions to implement features consistent with principles of the disclosure. Thus, implementations consistent with principles of the disclosure are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

From the foregoing description, one skilled in the art can readily ascertain the essential characteristics of the invention, and without departing from the spirit and scope thereof, can make changes and modifications of the invention to adapt it to various conditions and to utilize the present invention to its fullest extent. The specific embodiments described here are to be construed as merely illustrative, and not limiting of the scope of the invention in any way whatsoever. Moreover, features described in connection with one embodiment of the invention may be used in conjunction with other embodiments, even if not explicitly stated above. The entire disclosure of all applications, patents, and publications cited above are hereby incorporated by reference in their entirety.

We claim:

1. A method comprising:
extracting extraterrestrial metal with a mining spacecraft,
processing the extraterrestrial metal into a metal foam using metal foaming equipment onboard the mining spacecraft while the mining spacecraft is in space or processing the extraterrestrial metal into a gossamer structure using additive manufacturing equipment onboard the mining spacecraft while the mining spacecraft is in space, and
delivering the metal foam or gossamer structure intact to the Earth's surface.

2. The method of claim 1, further comprising:
identifying an extraterrestrial target area having the extraterrestrial metal, and
extracting the extraterrestrial metal from the extraterrestrial target area.

3. The method of claim 2, wherein extracting the extraterrestrial metal from the extraterrestrial target area further comprises using chemical vapor deposition to form wire from the extraterrestrial metal.

4. The method of claim 1, wherein the processing extraterrestrial metal into the metal foam or gossamer structure in space comprises:
determining a desired terminal velocity during delivery,
determining a density of the metal foam or gossamer structure in order to achieve the terminal velocity during delivery, and
processing the extraterrestrial metal into the metal foam or gossamer structure having the determined density.

5. The method of claim 4, wherein the processing extraterrestrial metal into the metal foam or gossamer structure in space further comprises:
determining a shape of the metal foam or gossamer structure in order to achieve the terminal velocity during delivery, and
processing the extraterrestrial metal into the metal foam or gossamer structure having the determined shape.

6. The method of claim 4, wherein determining the density of the metal foam or gossamer structure in order to achieve the terminal velocity during delivery is performed after extracting the extraterrestrial metal from the extraterrestrial target area.

7. The method of claim 1, wherein the extraterrestrial metal is at least one of nickel, iron, cobalt, and platinum group metals.

8. The method of claim 1, the extraterrestrial metal having a naturally occurring density in a range from 2.7 g/cm$^3$ to 22.7 g/cm$^3$.

9. The method of claim 1, the extraterrestrial metal having a naturally occurring density in a range from 12.0 g/cm$^3$ to 22.7 g/cm$^3$.

10. The method of claim 1, wherein the density of the metal foam or gossamer structure is less than the naturally occurring density of the extraterrestrial metal.

11. A method comprising:
extracting extraterrestrial metal using a mining spacecraft comprising one or more robotic units,
processing the extraterrestrial metal into a metal foam while in space using metal foaming equipment onboard at least one of the one or more robotic units of the mining spacecraft, or processing the extraterrestrial metal into a gossamer structure while in space using additive manufacturing equipment onboard at least one of the one or more robotic units of the mining spacecraft, and delivering the metal foam or gossamer structure intact to the Earth's surface.

* * * * *